United States Patent
Bleicher et al.

(10) Patent No.: US 12,457,424 B2
(45) Date of Patent: Oct. 28, 2025

(54) CAMERA AND METHOD FOR DETECTING AN OBJECT

(71) Applicant: SICK AG, Waldkirch (DE)

(72) Inventors: Katharina Bleicher, Waldkirch (DE);
Romain Müller, Waldkirch (DE);
Richard Nopper, Waldkirch (DE); Jan Mahler, Waldkirch (DE)

(73) Assignee: SICK AG, Waldkirch (DE)

( * ) Notice: Subject to any disclaimer, the term of this patent is extended or adjusted under 35 U.S.C. 154(b) by 315 days.

(21) Appl. No.: 18/118,192

(22) Filed: Mar. 7, 2023

(65) Prior Publication Data

US 2023/0353883 A1    Nov. 2, 2023

(30) Foreign Application Priority Data

Apr. 29, 2022   (EP) .................................... 22170675

(51) Int. Cl.
*H04N 23/75*    (2023.01)
*G02B 7/36*    (2021.01)
(Continued)

(52) U.S. Cl.
CPC ............... *H04N 23/75* (2023.01); *G02B 7/36* (2013.01); *G02B 26/0816* (2013.01);
(Continued)

(58) Field of Classification Search
CPC ........ H04N 23/75; H04N 23/71; H04N 25/11; H04N 25/78; H04N 23/70; H04N 23/67; H04N 23/81; H04N 23/671; H04N 23/54; H04N 23/55; G02B 7/36; G02B 26/0816; G03B 13/36; G03B 7/18; G06K 7/1413;
(Continued)

(56) References Cited

U.S. PATENT DOCUMENTS 3,949,162 A    4/1976   Malueg
5,223,969 A *  6/1993   Jeandeau ........... G02B 27/0031
                                                  348/E3.01
(Continued)

FOREIGN PATENT DOCUMENTS

EP    1698996 B1    12/2007
EP    1698995 B1    1/2008
(Continued)

OTHER PUBLICATIONS

European Search Report dated Oct. 21, 2022 corresponding to application No. 22170675.7-1208.

*Primary Examiner* — Nhan T Tran
(74) *Attorney, Agent, or Firm* — Nath, Goldberg & Meyer; Jerald L. Meyer

(57) ABSTRACT

A camera for detecting an object in a detection zone is provided that has an image sensor having a plurality of light reception elements for the generation of image data from received light from the detection zone), a reception optics having a focus adjustment unit for setting a focal position, with an angle of incidence of the received light on the image sensor changing on a change of the focal position, and a control and evaluation unit that is configured to set the focal position for a sharp recording of image data of the object, A sensitivity change of the capturing of the image data caused by the respective angle of incidence of the received light is compensated.

17 Claims, 3 Drawing Sheets

Figure 1:
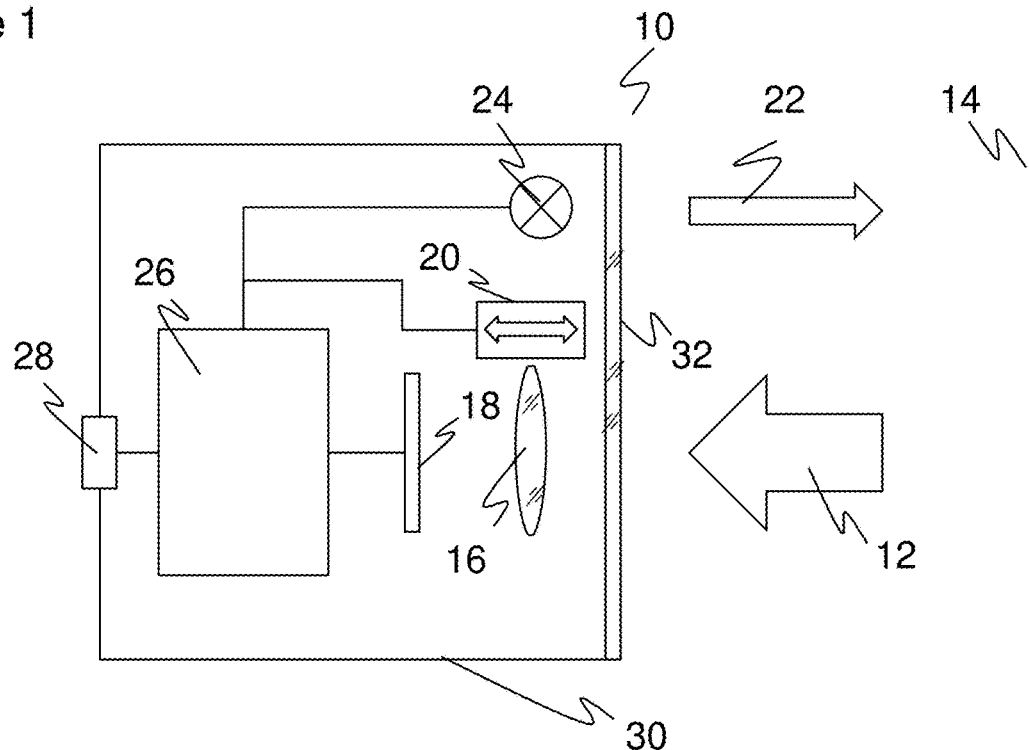

(51) Int. Cl.
*G02B 26/08* (2006.01)
*G03B 13/36* (2021.01)
*G06K 7/14* (2006.01)
*H04N 23/71* (2023.01)
*B65G 15/30* (2006.01)
*G03B 7/18* (2021.01)
*H04N 25/11* (2023.01)
*H04N 25/78* (2023.01)

(52) U.S. Cl.
CPC ........... *G03B 13/36* (2013.01); *G06K 7/1413* (2013.01); *G06K 7/1417* (2013.01); *H04N 23/71* (2023.01); *B65G 15/30* (2013.01); *B65G 2203/041* (2013.01); *G03B 7/18* (2013.01); *H04N 25/11* (2023.01); *H04N 25/78* (2023.01)

(58) Field of Classification Search
CPC ............. G06K 7/1417; G06K 7/10811; G06K 7/10851; G06K 7/10861; G06K 2007/10504; G06K 7/10722; G06K 7/10762; B65G 15/30; B65G 2203/041
See application file for complete search history.

(56) References Cited

U.S. PATENT DOCUMENTS

| | | | |
|---|---|---|---|
| 6,618,132 B1 * | 9/2003 | Vann | G01S 17/46 |
| | | | 235/494 |
| 8,622,302 B2 | 1/2014 | Olmstead | |
| 9,007,490 B1 | 4/2015 | Yuan et al. | |
| 2004/0196514 A1 * | 10/2004 | Tanimoto | H04N 25/701 |
| | | | 348/E3.027 |
| 2006/0196943 A1 | 9/2006 | Nuebling | |
| 2015/0268480 A1 * | 9/2015 | Schneider | G03B 13/36 |
| | | | 348/208.11 |
| 2015/0310242 A1 * | 10/2015 | Wehrle | G06K 7/10732 |
| | | | 235/470 |
| 2016/0366310 A1 * | 12/2016 | Riess | H04N 1/00827 |
| 2021/0150172 A1 * | 5/2021 | Müller | G06K 7/1478 |
| 2021/0326603 A1 * | 10/2021 | Kempf | G06V 10/147 |
| 2022/0303474 A1 * | 9/2022 | Kimura | H04N 23/611 |

FOREIGN PATENT DOCUMENTS

| | | | | |
|---|---|---|---|---|
| EP | 3822844 B1 | | 3/2022 | |
| JP | 2004128653 A | * | 4/2004 | ............ H04N 23/76 |
| WO | 2010131210 A1 | | 11/2010 | |

* cited by examiner

CAMERA AND METHOD FOR DETECTING AN OBJECT

The invention relates to a camera and to a method for detecting an object in a detection.

Cameras are used in a variety of ways in industrial applications to automatically detect object properties, for example for the inspection or for the measurement of objects. In this respect, images of the object are recorded and are evaluated in accordance with the task by image processing methods. A further use of cameras is the reading of codes. Objects with the codes located thereon are recorded using an image sensor and the code regions are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications.

A frequent detection situation is the installation of the camera above a conveyor belt. The camera records images during the relative movement of the object stream on the conveyor belt and instigates further processing steps in dependence on the object properties acquired. Such processing steps comprise, for example, the further processing adapted to the specific object at a machine which acts on the conveyed objects or a change to the object stream in that specific objects are expelled from the object stream within the framework of a quality control or the object stream is sorted into a plurality of partial object streams. If the camera is a camera-based code reader, the objects are identified with reference to the affixed codes for a correct sorting or for similar processing steps.

The camera is frequently a part of a complex sensor system. It is, for example, customary in reading tunnels on conveyor belts to install a plurality of camera-based code readers next to one another, on the one hand, to cover a larger conveyor belt width and, on the other hand, to install them from different perspectives to record objects from a plurality of sides. The geometry of the conveyed objects is furthermore frequently measured in advance using a separate sensor, for example a laser scanner to determine focus information, release times, image zones with objects and the like from it.

It is known to use a line scan camera whose image lines are assembled to form a total image in the course of the relative movement for the capture of high resolution images. Such line scan cameras typically record a monochrome image that is also called a gray scale image or a black and white image. EP 3 822 844 B1 discloses a camera-based code reader having a plurality of line arrangements that each form at least one white line and one color line. A gray scale image is recorded using the white line and simultaneously a color image using the color line. It is a special feature of EP 3 822 844 B1 that the color line only has pixels for two primary colors, for example for red and blue, and the third primary color, green in the example, is reconstructed with the aid of the white line.

The specific noise pattern of image sensors that is produced by a different behavior of the individual pixels is called a fixed pattern noise. It is divided into a component on an incidence of light (photo response non uniformity, PRNU) and a dark portion (dark signal non uniformity, DSNU). The different pixel behavior occurs with CCD and CMOS image sensors and is in particular a substantial interference source for CMOS image sensors.

The different sensitivities of the pixels can be measured and then compensated. The image sensor is illuminated by homogeneous light for this purpose for the component with incidence of light (PRNU) and the image produced is evaluated. An amplification using the respective standardized reciprocal value of the initial measurement can take place for the compensation. An offset compensation is possible beforehand.

The conventional PRNU compensation, however, only takes account of a light incidence with a perpendicular orientation. On a lateral light incidence, the sensitivity of the pixels can change, with geometrical effects of the image sensor and the quantum efficiency of the semiconductor inter alia playing a role with obliquely incident light. This effect has, however, previously not been given sufficient attention, above all not when the angle of incidence changes dynamically in operation. This is in turn in particular the case at specific focus adjustments that are based on geometrically changed received light paths, for example by a pivotable deflection mirror. Such focus adjustments are known, for example, from EP 1 698 995 B1 or EP 1 698 996 B1 that in turn are in no way of interest for effects on the brightness distributions or also only a PRNU in general.

U.S. Pat. No. 3,949,162 A explains fixed pattern noise compensation without discussing oblique light incidence in this respect. In U.S. Pat. No. 8,622,302 B2, a check is made in operation whether an original fixed pattern noise compensation is still appropriate and where necessary a new dark image is recorded to adapt the compensation.

U.S. Pat. No. 9,007,490 B1 generates a brightness compensation map and applies it as a pre-processing step of a super-resolution process to detected images. PRNU, vignetting, and intensity differences are discussed here with perpendicular and oblique light incidence. WO 2010/131210 A1 simultaneously compensates inhomogeneities and chromatic aberration in its image data. The reasons given for inhomogeneities are likewise fixed pattern noise, vignetting, and the stronger signals with perpendicular light incidence over oblique light incidence. It is, however, here not a question that the light is incident overall at an oblique angle since a camera is typically designed such that this does not happen. The case is above all not taken into account that the angle of the oblique light incidence changes dynamically in operation as in the case of a focusing by pivoting a deflection mirror, for example in accordance with the already named documents EP 1 698 995 B1 or EP 1 698 996 B1.

It is therefore the object of the invention to improve image capturing by a camera.

This object is satisfied by a camera and by a method for detecting image data of an object in a detection zone in accordance with the respective independent claim. Received light from the detection zone is incident on an image sensor having a plurality of light reception elements or pixels and the image sensor thus records images or image data of the detection zone and of an object located there. To produce sharp images, a reception optics having a focus adjustment unit is provided, that is a reception objective that has one or more lenses and other optical elements depending on the quality demands. A focus adjustment unit is used that is designed such that an angle of incidence of the received light on the image sensor changes at the same time as a change of the focal position. A control and evaluation unit sets a respective suitable focal position with the aid of the focus adjustment unit to record a sharp image of the object. The control and evaluation unit in particular forms an autofocus together with the focus adjustment unit. For this purpose, for example, the distance from the object can be measured and the focal position can be set corresponding to the measured distance with the aid of an internal or external distance sensor. The control and evaluation unit is preferably additionally connected to the image sensor to read, pre-process, and evaluate image data, and the like. Alternatively, there are respective separate modules that take care of the focusing, on the one hand, and the other tasks of the camera such as the processing of the image data, on the other hand.

The invention starts from the basic idea of dynamically compensating the effects of the focus adjustment on the angle of incidence of the received light. The intensities registered by the light reception elements of the image sensor have a dependence on this angle of incidence; there is a sensitivity change caused by the respective angle of incidence that can be called an angle dependent PRNU. The control and evaluation unit is configured to compensate the angle-dependent PRNU in dependence on the respective angle of incidence.

The invention has the advantage that an improved, and preferably exact, brightness representation is made possible. The image quality and, in the event of a color camera, also the color reproduction are thereby improved. Downstream image processing steps produce better results with a feature extraction, for example. A standard PRNU compensation would no longer be sufficient with dynamically changing angles of incidence. This would in turn preclude some particularly efficient focusing processes that produce different angles of incidence by a focal adjustment such as those in accordance with EP 1 698 995 B1 or EP 1 698 996 B1. The invention makes PRNU compensation possible, even with a changing angle of incidence and thus also opens up such focusing processes.

The control and evaluation unit is preferably configured to compensate the capturing of image data by calculatory and/or physical adaptation of an amplification factor. The adapted amplification factor counteracts the respective intensity change on the basis of the current angle of incidence. For this purpose, an amplifier element can be physically controlled and its amplification factor (gain) can be adapted, for example in the image sensor or in a downstream readout circuit. Alternatively or additionally, a calculatory adaptation of the amplification factor in the form of an image evaluation is conceivable in which the read image data are adapted corresponding to the amplification factor. Brightness values of the image data are here in particular rescaled by the amplification factor, with brightness values here being able to signify both gray values and brightness values of color pixels.

The reception optics preferably has a pivotable optical element, in particular a deflection mirror, with a pivoting of the optical element changing the focal position and thus the angle of incidence of the received light. In such an embodiment, the pivotal optical element is a reason or the reason for the changing angle of incidence of the received light. This makes possible a particularly simple and fast focus adjustment by changed light paths in the reception path, with the changing angles of incidence as a rule not being the goal, but rather a side effect. Such a focus adjustment is presented, for example, in EP 1 698 995 B1 or E 1 698 996 B1 that are named in the introduction and to which reference is made for further details. The invention makes it possible to use the advantages of such a focus adjustment and simultaneously to avoid or at least reduce an impairment of the image data by changing angle of incidence of the received light.

The control and evaluation unit preferably has a memory in which a correction table or a correction rule is stored that associates a brightness adaptation to a respective angle of incidence of the received light. It can here be an internal or external memory of the control and evaluation unit. The correction table (lookup table, LUT) makes it possible to very quickly locate the required brightness adaptation for a respective angle of incidence. Alternatively to a correction table, a correction rule is stored that can be understood as a function of the brightness adaptation in dependence on the angle of incidence. This function can be located abstractly by modeling, simulation, and the like. The correction rule is particularly preferably derived from a correction table and combines them in a compact manner, for example by means of a function fit, in particular a polynomial fit, to save memory.

The control and evaluation unit preferably has a memory in which a correction table or a correction rule is stored that associates a brightness adaptation with a respective focal position. It can be the same memory or a different memory with that of the previous paragraph, with in the latter case the two memories being able to be called the first and second memories if both are provided. The changing angle of incidence arises by a focus adjustment. It is therefore possible to directly relate the compensation of the angle dependent PRNU to the focus adjustment. A brightness adaptation is thus now directly associated with a focal position. The angle of incidence is here furthermore taken into account in the chain of focal position, angle of incidence, brightness adaptation, but no longer has to be explicitly or at all named or known because this is already included in the correction table or correction rule. The previous paragraph applies accordingly to the configuration of the correction table or correction rule.

The focus adjustment unit preferably has a drive, with the control and evaluation unit having a memory in which a correction table or correction rule is stored that associates a brightness adjustment with a respective position of the drive. This can again be the same memory, a second memory, or a third memory depending on the embodiment. The event chain is extended again here. The drive effects the focus adjustment; the latter changes the angle of incidence and a brightness adaptation is located for this purpose. The correction table or correction rule now starts with the drive and implicitly takes the focal position and the angle of incidence into account. The input values for the drive can be specified, for example, in the form of motor positions, rotational positions, or motor increments. The above statements apply accordingly to the configuration of the correction table or correction rule.

The correction table or correction rule is preferably determined in a teaching process in which the image sensor is homogeneously illuminated and the intensity distribution is measured via the light reception elements for different angles of incidence of the received light. Such a teaching or calibration can take place, for example, in the production or during the putting into operation. If the teaching process only takes place during the putting into operation, experience has shown that it becomes more difficult to achieve a homogeneous illumination. The influence of the inhomogeneity can then be determined and compensated in an additional calculatory step, but the effort is higher than with a teaching during the production under conditions that can be controlled better. Images are recorded and the respective brightness levels of the light reception elements are determined under the homogeneous illumination. Fluctuations between the light reception elements are due to the homogeneous illumination of a PRNU. Fluctuations that occur due to the variation of the angle of incidence are to be associated with the angle dependent PRNU. As already mentioned, conventional PRNU and angle dependent PRNU can be processed individually or together and the conventional PRNU of the image sensor is possibly already balanced ex works. The control and evaluation unit can be configured to automatically carry out the teaching process in a teaching mode in that the focal positions and thus angles of incidence are run through and images recorded and evaluated in so doing. The correction table or correction rule can subsequently be acquired from the images and this is ultimately the respective inverse of the intensity distribution over the image recorded under homogeneous illumination for a respective angular position. The camera can have its own illumination to generate the homogeneous illumination during the teaching process.

The control and evaluation unit is preferably configured to compensate the sensitivity change caused by the respective angle of incidence of the received light and other varying sensitivities of the light receiver elements in respective separate steps. The angle dependent PRNU is only one of the effects that influence a sensitivity of the image sensor or a sensitivity distribution over the light reception elements of the image sensor. In accordance with this embodiment, other compensations, for example a conventional DSNU or PRNU, are furthermore carried out separately; the compensation in accordance with the invention is added as a separate step. Alternatively, the compensation of the angle dependent PRNU in accordance with the invention comprises at least one further such step for the compensation of sensitivities of the light reception elements. This can be influenced, for example, via the procedure on the teaching of correction tables or correction rules in that the other combinations such as a conventional DSNU or PRNU are switched on or off during the teaching. In the first case, the correction table or correction rule will also comprise the other compensations, in the latter case only separately the compensation of the angle dependent PRNU.

The control and evaluation unit is preferably configured to compensate the sensitivity change caused by the respective angle of incidence of the received light for all the light reception elements together, for groups, in particular rows, of light reception elements together, or for individual light reception elements. The compensation of the angle dependent PRNU thus takes place individually on the level of individual pixels, somewhat more coarsely of groups of pixels or across the board for the total image sensor. Accordingly, entries of the correction tables or the correction rules are created pixel-wise, group-wise, or only once for the whole image sensor. A particularly preferred group extends over a row of pixels.

A color filter is preferably arranged upstream of at least some light reception elements. This enables the recording of color images. The color filters, however, generate an even more angle dependent PRNU, and indeed in particular also parasitically on neighboring pixels. If color filters are consequently used, the advantages of the compensation of the angle dependent PRNU in accordance with the invention manifest in a particular manner.

The image sensor is preferably configured as a multiple line scan sensor having two to four rows of light reception elements, having at least one white line whose light reception elements for recording a gray scale image are sensitive to white light, and at least one color line whose light reception elements for recording a color image are sensitive to only one respective color. Light reception elements of the white line thus perceive the whole optical spectrum and do not have any color filters, for example. The unavoidable hardware limitations of the light reception elements used naturally form the limit of the received light. In principle, white pixels could be interspersed again into a color line; however, the white line per se is responsible for such image information. A gray scale image or a black and white image can be acquired in full resolution at high contrasts and with a best possible signal-to-noise ratio and simultaneously color information that can be used for different additional evaluations. This additional color detection does not come at the cost of the resolution or of the signal-to-noise ratio thanks to the white line.

The advantage of a linear sensor is that images can be recorded at a very high resolution with relatively few pixels in comparison with a matrix sensor in a relative movement between the camera and the object. The multiple line scan sensor has few pixels in comparison with a high resolution matrix sensor; they are preferably resolutions of several thousand or even several ten thousand pixels. Due to color lines, an additional capturing of color images is also possible using a line scan sensor or multiple line scan sensor. Said numbers of two to four line arrangements are exact specifications here, not minimum specifications. A particularly compact design of the image sensor is achieved with a few linear arrangements. The minimal embodiment is a dual line having one white line and one color line. To achieve a higher resolution of the color image in the line direction, at least two color lines are preferably provided.

The light reception pixels within a color line are preferably sensitive to the same color. In other words, the whole color line is uniform, for example a red, blue or green line. The corresponding color information is thus detected in full resolution. The light reception pixels with a color line can also be sensitive to different colors, in particular in an alternating order such as red-blue-red-blue. It is further conceivable to combine uniformly color lines and mixed color lines with one another. The color lines particularly preferably have light reception pixels that are sensitive to a respective one of two primary colors and do not have any light reception pixels that are sensitive to the third primary color. Primary colors are the additive primary colors red, green, and blur or the subtractive primary colors cyan, magenta, and yellow. Light reception pixels and linear arrangements are saved in that only two thereof are provided. It would alternatively be conceivable that all three respective primary colors are present (RGBW, CMYW). The control and evaluation unit is preferably configured to reconstruct the third primary color from the two primary colors with the aid of the white line. The while line records a superposition of all the primary colors so that the third primary color can be isolated when the two other primary colors are recorded. The recorded primary colors are preferably red and blue, while green is reconstructed. Reference is made to EP 3 822 844 B1 named in the introduction for further possible aspects of a color multiple line scan sensor and the reconstruction of a primary color.

In a multiple line scan sensor, a very different angle dependent PRNU of the lines can result depending on the color and arrangement of the color pixels. The information of the plurality of lines is typically combined, for instance in a black and white image and a color image, in particular while reconstructing a primary color. The multiple line scan sensor should thus effectively only record a respective one image line; it is not a question of an additional resolution transversely to the lines; this is only successively achieved by the repeated recording of line images in a relative movement. Without the compensation in accordance with the invention, this combination of lines can result in extremely unfavorable combinations because the input data from the different lines are not only falsified by the angle dependent PRNU, but are also falsified to different degrees so that color fidelity is practically unattainable without the compensation.

A microlens is preferably arranged upstream of at least some light reception elements. A microlens is preferably arranged upstream of every light reception element so that a microlens array is provided. There can be a 1:1 association, but also one microlens can be responsible for a plurality of light reception elements. The microlenses are part of the reception optics. They increase the angle dependent PRNU substantially in part.

The control and evaluation unit is preferably configured to read a code content of a code on the detected object with the aid of the image data. The camera thus becomes a camera-based code reader for barcodes and/or 2D codes according to various standards, optionally also for text recognition (optical character recognition, OCR). Before a code is read, a segmentation is even more preferably carried out by which regions of interest (ROIs) are identified as code candidates. A high image quality in accordance with the compensation of the angle dependent PRNU in accordance with the invention increases the chance of successfully reading a code and thus the reading rate decisive for code readers.

The camera is preferably installed in a stationary manner at a conveying device that leads objects to be detected in a conveying direction through the detection zone. This is a common industrial application of a camera and the conveying device takes care that the objects move through the detection zone. The successive line-wise detection addressed multiple times is thereby made possible in embodiments having an image sensor as a line sensor or multiple line scan sensor. The focal position has to be constantly adapted due to the constantly changing object sections and objects in the course of the conveying movement and the angle of incidence of the received light thus changes, with the respective angle dependent PRNU that is produced being dynamically compensated in accordance with the invention. The speed of the conveying device and thus of the moving objects can be acquired from a conveyor control, a sensor such as an encoder at the conveying device, or from a parameterization of the conveyor to determine when an object will be located in a recording position and the like.

The method in accordance with the invention can be further developed in a similar manner and shows similar advantages in so doing. Such advantageous features are described in an exemplary, but not exclusive manner in the subordinate claims dependent on the independent claims.

Figure 2:
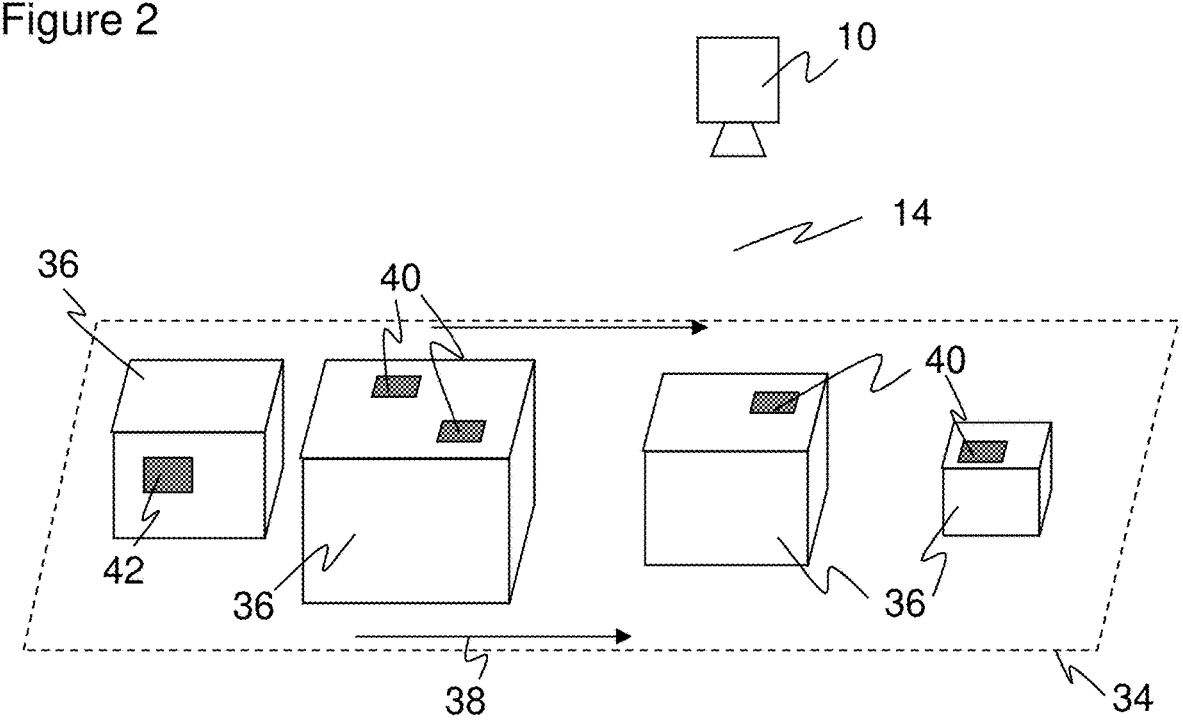
Figure 3:
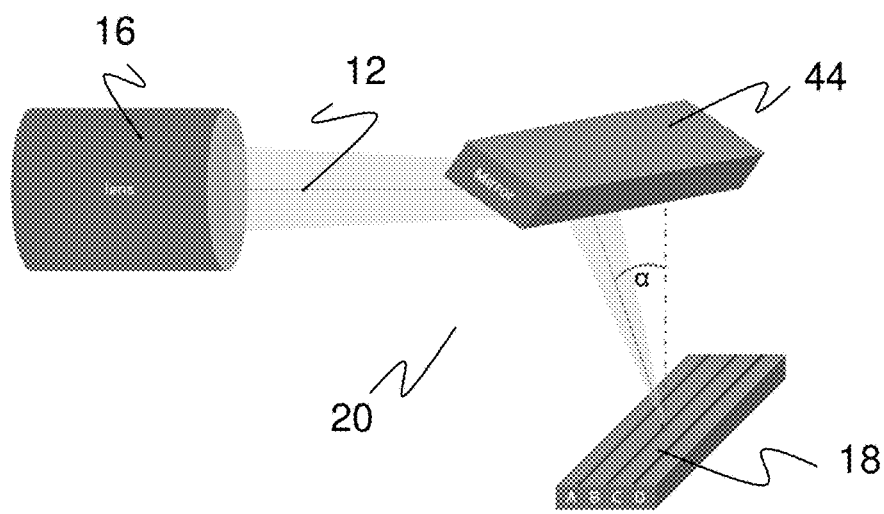
Figure 4:
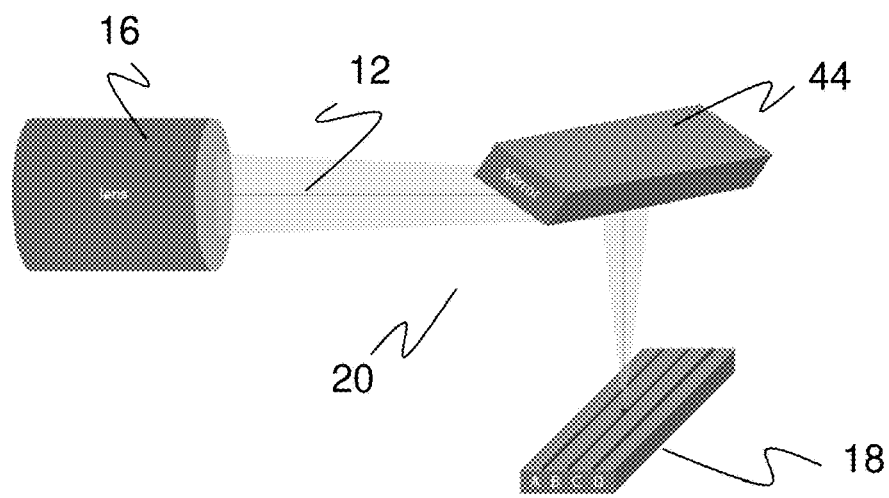
Figure 5:
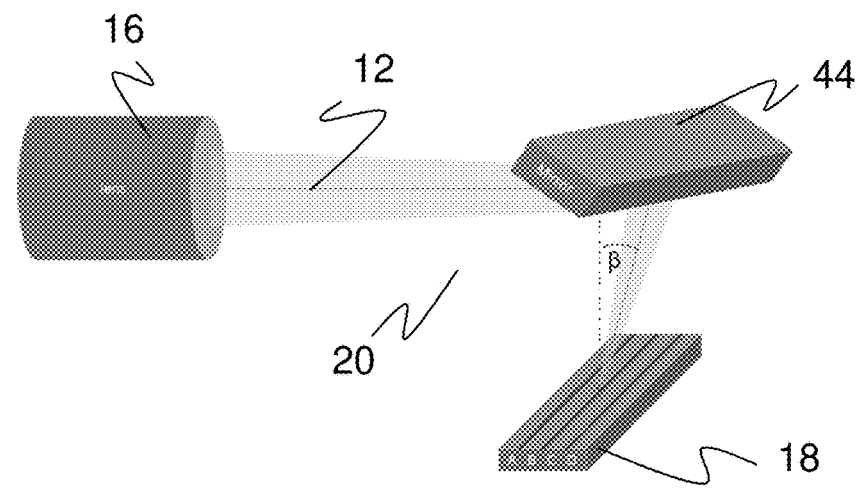
Figure 6:
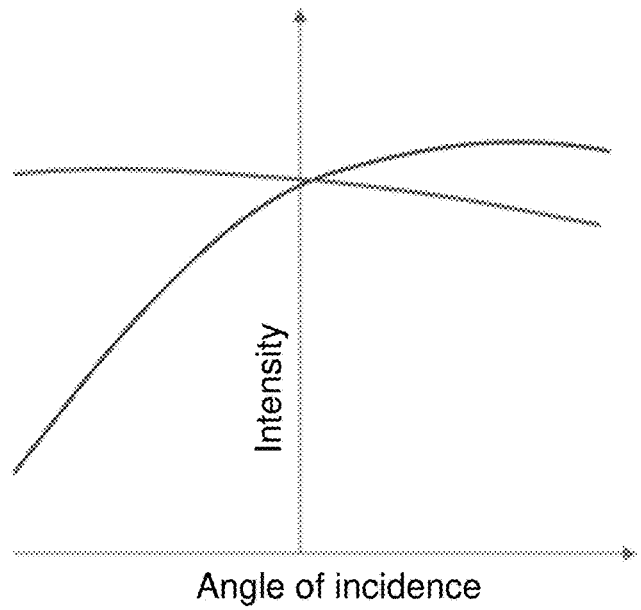
Figure 7:
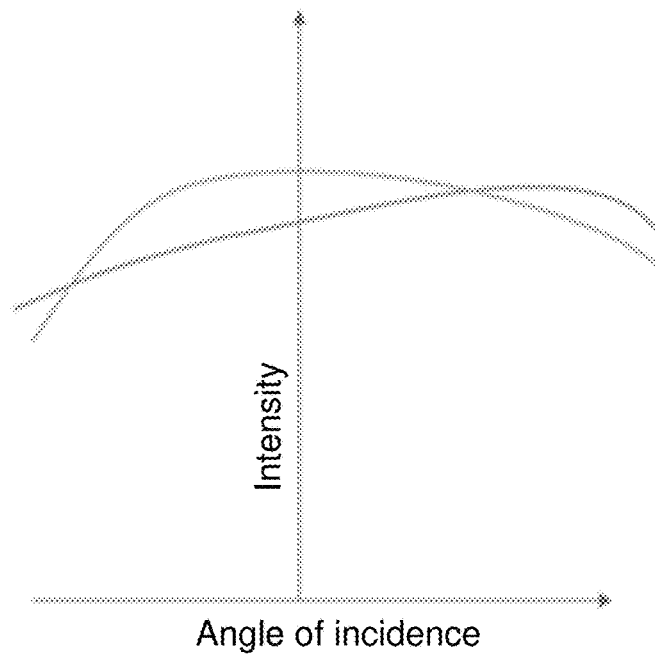

The invention will be explained in more detail in the following also with respect to further features and advantages by way of example with reference to embodiments and to the enclosed drawing. The Figures of the drawing show in:

FIG. 1 a schematic sectional representation of a camera;

FIG. 2 a three-dimensional view of an exemplary use of the camera in an installation at a conveyor belt;

FIG. 3 a schematic representation of a focus adjustment for a camera having a pivotable optical element in a first focal position with a first angle of incidence of the received light on the image sensor;

FIG. 4 a representation in accordance with FIG. 3 now with a perpendicular angle of incidence of the received light on the image sensor;

FIG. 5 a representation in accordance with FIG. 3 with a further angle of incidence of the received light on the image sensor;

FIG. 6 exemplary intensity curves of two pixels of an image sensor in dependence on the angle of incidence of the received light on the image sensor; and FIG. 7 exemplary intensity curves in accordance with FIG. 6 for two further pixels of an image sensor.

FIG. 1 shows a schematic sectional representation of a camera 10. The camera is, for example, a camera-based code reader or an industrial camera (machine vision camera), for example for the quality control or automatic detection of specific features. Received light 12 from a detection zone 14 is incident on a reception optics 16 that guides the received light 12 onto an image sensor 18 having a plurality of light reception elements or pixels in particular arranged to form a line, a plurality of lines, or a matrix. The optical elements of the reception optics 16 are preferably configured as an objective composed of a plurality of lenses and other optical elements such as diaphragms, prisms, and the like, but here only represented by a lens for reasons of simplicity. The reception optics 16 can be set to different focal positions by means of a focus adjustment 20 to record objects in focus at different distances. For this purpose, the most varied functional principles are conceivable, for instance a change of the image back focal distance by a stepper motor or a moving coil actuator system. The focus adjustment 20 is shown only purely schematically in FIG. 1. As will be explained below with reference to FIGS. 3 to 5, the angle of incidence of the received light 12 on the image sensor 18 changes simultaneously with the focal position. An optional internal or external distance sensor, not shown, can be provided to measure the distance from an object to be recorded and to derive a required focal position therefrom.

To illuminate the detection zone 14 with transmitted light 22 during a recording of the camera 10, the camera 10 comprises an optional internal or external illumination unit 24 that is shown in FIG. 1 in the form of a simple light source and without a transmission optics. In other embodiments, a plurality of light sources such as LEDs or laser diodes are arranged around the reception path, in ring form, for example, and can also be multi-color and controllable in groups or individually to adapt parameters of the illumination unit 24 such as its color, intensity, and direction.

A control and evaluation unit 26 is connected to the focus adjustment 20, to the illumination unit 24, and to the image sensor 18 and is responsible for the control work, the evaluation work, and for other coordination work in the camera 10. It therefore controls the focus adjustment 20 with a suitable focal position in particular corresponding to a measured distance value from an object to be recorded and reads image data of the image sensor 18 to store them or to output them to an interface 28. The control and evaluation unit 26 is preferably able to localize and decode code regions in the image data so that the camera 10 becomes a camera-based code reader. A plurality of modules can be provided for the different control and evaluation work, for example to perform the focus adaptations in a separate module or to perform pre-processing of the image data on a separate FPGA. The camera 10 is protected by a housing 30 that is terminated by a front screen 32 in the front region where the received light 12 is incident.

FIG. 2 shows a possible use of the camera 10 in an installation at a conveyor belt 34. The conveyor belt 34 conveys objects 36, as indicated by the arrow 38, through the detection region 14 of the camera 10. The objects 36 can bear code zones 40 at their outer surfaces. It is the object of the camera 10 to detect properties of the objects 36 and, in a preferred use as a code reader, to recognize the code regions 40, to read and decode the codes affixed there, and to associate them with the respective associated object 36. In order in particular also to recognize laterally applied code regions 42, additional cameras 10, not shown, are preferably used from different perspectives. In addition, a plurality of cameras can be arranged next to one another to together cover a wider detection zone 14.

FIGS. 3 to 5 very schematically illustrate a focus adjustment 20 that is based on a pivoting of an optical element 44, in particular a deflection mirror. The image sensor 18 is here by way of example a multiple line scan sensor of four line arrangements A-D of light reception elements or pixels. Such a multiple line scan sensor can in particular be used for the simultaneous capturing of black and white images and color images as is described in EP 3 822 844 B1 named in the introduction.

FIG. 3 shows a first pivot position of the optical element 44 and thus a first focal position with an angle of incidence $\alpha$; FIG. 4 shows a second pivot position of the optical element and thus a second focal position with a perpendicular light incidence; and FIG. 5 shows a third pivot position and thus a third focal position with an angle of incidence $\beta$. Further focal positions are adopted in further angular positions of the optical element and further angles of incidence of the received light 12 are thus incident on the image sensor 18. Such a focus adjustment 20 is explained in more detail, for example, in EP 1 698 995 B1 and EP 1 698 996 B1 that are named in the introduction and to which reference is additionally made. The light path between the reception optics 16 and the image sensor 18 is shortened or lengthened in dependence on the angular position of the optical element 44; the focal position is thus varied. It is conceivable to also pivot the image sensor 18 so that the image sensor 18 continues to be impinged by the received light 12 at the different angles of incidence. The focus adjustment 20 shown is to be understood as an example; the angle of incidence of the received light 12 on the image sensor 18 can also change with the focal position with other focus adjustment principle.

FIG. 6 shows exemplary intensity curves of two light reception elements or pixels of the image sensor 18 in dependence on the angle of incidence of the received light on the image sensor 18. The sensitivity of the light reception elements varies with the angle of incidence, and indeed individually very differently in part. The reasons for this can be the geometrical circumstances and the quantum efficiency, but also microlenses or color filters in front of the light reception elements. The effect illustrated in FIG. 6 can be called an angle dependent PRNU. With knowledge of the current angle of incidence and of the angle dependent PRNU, their effect can be compensated in that an analog or digital amplification of the respective light reception element is reciprocally adapted and/or a corresponding offset is carried out in the image data.

FIG. 7 shows further exemplary intensity curves for two further light reception element. Unlike FIG. 6, there are here also differences for a perpendicular light incidence at the angle of incidence corresponding to the position of the Y axis. Further effects can accordingly be superposed on the angle dependent PRNU that affect the sensitivity of the pixels and they can be compensated together with the angle dependent PRNU or separately depending on the embodiment.

The dependencies between the angle of incidence and the required brightness adaptation can be stored as a compensation table (lookup table, LUT) or as a compensation rule, i.e. as a functional relationship or formula. A compensation rule can arise by a function fit or a polynomial as a compact combination from a compensation table.

Theoretical considerations, for example in the form of a model of the camera 10 or of a simulation can lead to a compensation table or compensation rule.

Alternatively or additionally, the compensation table or compensation rule can be acquired in a teaching or calibration process, for example during a production balance. In this respect, the angle of incidence of the received light 12 is varied under homogeneous illumination of the image sensor 16, for example, in one degree steps or with another desired fineness, and in so doing the intensities received by the light reception elements of the image sensor 18 are measured. The required brightness adaptations can be calculated from them. The control and evaluation unit 26 can for this purpose provide a teaching module in which these variations of the angle of incidence and the corresponding measurements and calculations for acquiring the correction table or correction rule are carried out automatically.

It is admittedly ultimately the angle of incidence that causes the angle dependent PRNU The camera 10, however, has more direct access to its focal position that includes the respective angle of incidence. It is therefore conceivable to associate a respective brightness adaptation in the correction table or correction rule to a focal position instead of to an angle of incidence. The processing chain can be extended by a further step in that the correction table or correction rule relates to a motor control of the focus adjustment 20 and associates a respective brightness adaptation with a motor position. For that is the actuator that is controlled to adjust the focal position and thus the angle of the optical element 44 and ultimately the angle of incidence of the received light 12 at the image sensor 18.

The motor position can in particular be expressed via motor increments that each correspond to a respective rotational position of the motor. In a teaching process designed for this purpose, the motor increments are run through and the intensities of the pixels is measured after an image recording under a homogeneous illumination. An incremental encoder can, in the sense of a regulation of the motor movements, check whether the respective controlled rotational position of the motor is actually adopted. The control and evaluation unit 26 is typically also aware of an association between motor positions or motor increments and the focal position so that the correction table or correction rule can be selectively linked to the motor position or the focal position. The motor position can be used as the basis of a linear movement instead of a rotational position of the motor.

In operation, the correction table or correction rule is used to associate a brightness adaptation with the motor position, the focal positions, or the angular position of the optical element 44 or the angle of incidence of the received light 12 on the image sensor in dependence on the embodiment. In this respect, the correction table or correction rule can directly include the compensating values, for example amplification factors required for the compensation or first only the intensity differences through the angle dependent PRNU from which then the required compensation is determined in real time. Since the compensation should take place in real time where possible, it is advantageous to implement the corresponding functionality of the compensation unit 26 on an FPGA (field programmable gate array) or in an ASIC (application specific integrated circuit). An actual balance preferably no longer takes place in operation, the compensation is then rather based completely on the previously taught relationships. The compensation can take place as a control, not as a regulation, since the interference value relevant here is known, namely the respective focal position.

The compensation of the angle dependent PRNU can take place with different granular fineness. An individual compensation on the level of individual light reception elements of the image sensor 18 is possible. Alternatively, only an across-the-board one-time adaptation for the whole image sensor 18 takes place. As an intermediate solution, pixels for the compensation are combined group-wise and compensated in the same manner within the group, for example with reference to a mean value determined for this group. A particularly preferred special case of such groups is a combination in lines, in particular for a multiple line scan sensor as shown by way of example in FIGS. 3 to 5. The angle dependent PRNU should not differ all that much within a group so that a group combination is sensible. This is the case with white or color lines of a multiple line scan sensor.

The image sensor 18 is color sensitive in a preferred embodiment. For this purpose, its light reception elements have color filters arranged upstream at least in part, for instance in a Bayer pattern, for a color line of a multiple line scan sensor having a color filter that is uniform over the line or a sequence, for example an alternating sequence, of colors. There can be monochrome light reception elements or at least a whole monochrome line therebetween. The angle dependent PRNU varies particularly highly in the case of such color filters and differently in dependence on the color, with parasitic effects also being able to occur on light reception elements without their own color filters, but in the vicinity of light reception elements with a color filter. With a multiple line scan sensor, the information of the plurality of lines is preferably combined to in particular acquire a respective single black and white image line or a color image line aggregated from the primary colors. In such a combination, the respective influence of the angle dependent PRNU is accumulated and the compensation in accordance with the invention is therefore particularly advantageous because otherwise a particularly pronounced total error would result. Amplifying effects of the PRNU can also arise through other elements arranged upstream of the image sensor 18, for example microlenses, that cooperate as parts of the reception optics 16 with its focus adjustable optical elements.

The invention claimed is:

1. A camera for detecting an object in a detection zone, comprising:
   an image sensor having a plurality of light reception elements for the generation of image data from received light from the detection zone;
   reception optics having a focus adjustment unit for setting a focal position, wherein a change in the focal position of the reception optics results in a change of an angle of incidence of the received light on the image sensor, the reception optics further comprising a pivotable deflection mirror, wherein pivoting of the pivotable deflection mirror changes the focal position and correspondingly changes the angle of incidence of the received light, and wherein the pivotable deflection mirror is positioned between a lens of the reception optics and the image sensor; and
   a control and evaluation unit that is configured to set the focal position for a sharp recording of the image data of the object,
   wherein the control and evaluation unit is further configured to dynamically compensate for a change in sensitivity of capturing of the image data caused by the change of the angle of incidence of the received light resulting from the change in the focal position.

2. The camera in accordance with claim 1, wherein the control and evaluation unit is configured to compensate for the capturing of image data by a calculatory and/or physical adaptation of an amplification factor.

3. The camera in accordance with claim 1, wherein the control and evaluation unit has a memory in which a correction table or a correction rule is stored that associates a brightness adaptation with a respective angle of incidence of the received light.

4. The camera in accordance with claim 1, wherein the control and evaluation unit has a memory in which a correction table or a correction rule is stored that associates a brightness adaptation with a respective focal position.

5. The camera in accordance with claim 1, wherein the focus adjustment unit has a drive and wherein the control and evaluation unit has a memory in which a correction table or correction rule is stored that associates a brightness adjustment with a respective position of the drive.

6. The camera in accordance with claim 3, wherein the correction table or the correction rule is determined in a teaching process in which the image sensor is homogeneously illuminated and the intensity distribution is measured via the light reception elements for different angles of incidence of the received light.

7. The camera in accordance with claim 1, wherein the control and evaluation unit is configured to compensate the sensitivity change caused by the respective angle of incidence of the received light and other varying sensitivities of the light receiver elements in respective separate steps.

8. The camera in accordance with claim 1, wherein the control and evaluation unit is configured to compensate the sensitivity change caused by the respective angle of incidence of the received light for all the light reception elements together, for groups of light reception elements together, or for individual light reception elements.

9. The camera in accordance with claim 8, wherein the groups are rows.

10. The camera in accordance with claim 1, wherein a color filter is arranged upstream of at least some light reception elements.

11. The camera in accordance with claim 1, wherein the image sensor is configured as a multiple line scan sensor having two to four rows of light reception elements, having at least one white line whose light reception elements for recording a gray scale image are sensitive to white light, and at least one color line whose light reception elements for recording a color image are sensitive to light of only one respective color.

12. The camera in accordance with claim 1, wherein a microlens filter is arranged upstream of at least some light reception elements.

13. The camera in accordance with claim 1, wherein the control and evaluation unit is configured to read a code content of a code on a detected object with the aid of the image data.

14. The camera in accordance with claim 1, that is installed in a stationary manner at a conveying device that guides the object to be detected in a direction of conveying through the detection zone.

15. The camera in accordance with claim 4, wherein the correction table or the correction rule is determined in a teaching process in which the image sensor is homogeneously illuminated and the intensity distribution is measured via the light reception elements for different angles of incidence of the received light.

16. The camera in accordance with claim 5, wherein the correction table or the correction rule is determined in a teaching process in which the image sensor is homogeneously illuminated and the intensity distribution is measured via the light reception elements for different angles of incidence of the received light.

17. A method of detecting an object in a detection zone, comprising:

generating image data from received light from the detection zone using an image sensor having a plurality of light reception elements;

setting a focal position of reception optics using a focus adjustment unit for a sharp recording of the image data of the object, wherein a change in the focal position of the reception optics results in a change of an angle of incidence of the received light on the image sensor, the reception optics further comprising a pivotable deflection mirror, wherein pivoting of the pivotable deflection mirror changes the focal position and correspondingly changes the angle of incidence of the received light, and wherein the pivotable deflection mirror is positioned between a lens of the reception optics and the image sensor; and dynamically compensating for a sensitivity change of capturing of the image data caused by the change of the angle of incidence of the received light resulting from the change in the focal position.

* * * * *